Figure 1:
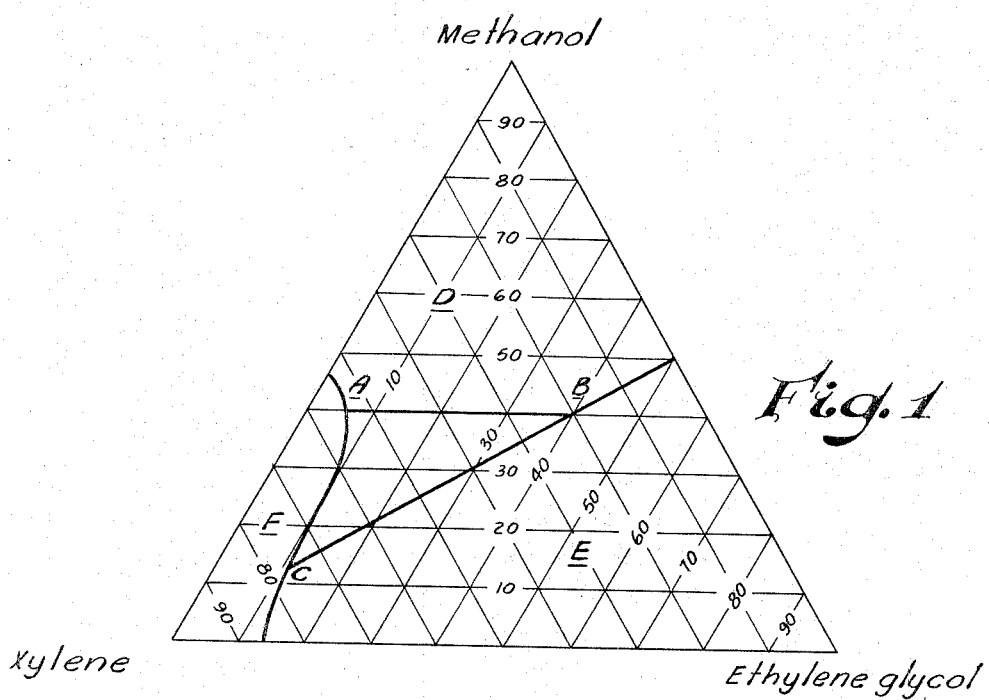

INVENTORS.
Harvey D. Ledbetter
James C. Mackey
Kernal G. Shaw

BY *Richard D. Waterman*

AGENT

United States Patent Office 3,337,519
Patented Aug. 22, 1967

3,337,519
METHOD FOR REMOVING LOW-MOLECULAR WEIGHT POLYMER FRACTIONS
Harvey D. Ledbetter and James C. Mackey, Walnut Creek, and Kernal G. Shaw, Concord, Calif., assignors to The Dow Chemical Company, Midland, Mich., a corporation of Delaware
Filed Feb. 18, 1963, Ser. No. 259,463
22 Claims. (Cl. 260—93.7)

This invention relates to a method for removing deleterious polymer fractions from the more desirable and useful fractions. More particularly, the present invention relates to removing low-molecular weight polymer fractions from higher molecular weight fractions while the polymer is in solution by liquid-liquid extraction.

It is well known to polymerize olefins to high molecular weight polymers by various means including both high pressure techniques and the relatively new low pressure techniques, the latter utilizing "Ziegler" type catalysts. For instance, alpha-olefins, e.g., propylene, can be polymerized to highly crystalline stereoregular polymers by special variants of these "Ziegler" catalysts. Such polymers are obtained as a heterogeneous mixture of polymeric molecules of varying characteristics. The product of a usual polymerization of propylene can be characterized as comprised of four mutually exclusive fractions which may be described as:

(1) A grease (or oil) fraction of about 5 to 7% of the total product which is essentially completely amorphous (i.e., non-crystalline and uncrystallizable; i.e., atactic), and has an average molecular weight of about 10,000 or less. This fraction is soluble in xylene-isopropanol (50 volume percent each) at room temperature, and in common aliphatic solvents at room, or very slightly elevated, temperature. It is an undesirable component of polypropylene for most commercial uses, since it contributes to reduced stiffness, lower softening temperature, and lower tensile strength in the polymer. Furthermore, in a highly crystalline polypropylene it tends to exude from the surface of fabricated articles, especially at elevated temperatures, lending to such articles a highly undesirable sticky or tacky feel and a surface prone to collect dirt and other particles.

(2) A wax fraction of about 5 to 10% of the total product, which is at least about 80% amorphous and which component molecules range in molecular weight from around 10,000 to very high (e.g., several hundred thousand). The average molecular weight of this fraction is ordinarily around 80,000. At room temperature this fraction is soluble in mixed xylenes, but is substantially insoluble in a 50-50 mixture of xylene-isopropanol. It is slightly soluble in cold aliphatic solvents, and appreciably so at higher temperatures, e.g., at about 100° C. This component is much less detrimental to a polypropylene product than is the grease, for it is less damaging to the polymer's stiffness and temperature resistance, and is not prone to the objectionable bleeding or exudation of the grease fraction.

(3) A low molecular weight (10-30,000, or so) crystalline fraction of about 2-10% of the total product. This fraction is somewhat soluble in xylene, especially at elevated temperatures. It is insoluble in xylene-isopropanol mixtures, and in aliphatic solvents at all temperatures up to around 60° C. This component is deleterious to product properties in a different way; it is a brittle fraction without appreciable tensile strength, and reduces the usefulness of a product roughly in proportion to the amount present therein.

(4) a hard, tough, crystalline resinous polypropylene fraction of high molecular weight (averaging from 200,000 to 1,000,000 or more). This is the material most prized in commerce and most extensively used of the four fractions.

Accordingly, it is desirable that the high molecular weight crystalline fraction (4) be obtained in as pure a state as possible, or, at least to have a minimum of the grease fraction (1) and low molecular weight crystalline fraction (3) included therein.

In one method of preparing such stereoregular polymers, the polymerization of the alpha-olefin is carried out in an aliphatic or cycloaliphatic liquid medium at a temperature range of from about 40° to 100° C. Under these conditions the polymer is substantially insoluble in the polymerization medium and a slurry-like system obtains. Polymer is separated from the system by filtration, centrifugation or similar methods prior to further polymer processing such as washing, drying, and re-melting and extruding to form pellets of compacted polymer. Concurrent with the separation of the polymer solids from the liquid medium a certain amount of polymer "fractionation" is achieved since fraction (1) and a portion of fraction (2) remain in the liquid. The separated polymer, which is the high molecular weight crystalline fraction (4), is usually acceptable for most purposes.

A second method for polymerizing the alpha-olefins to produce such stereo-regular polymers is to solution polymerize the alpha-olefin, that is, the polymer is obtained in solution instead of slurry form. It is apparent that the solution polymerization method can offer numerous advantages of efficiency, lower cost, and improved polymer purity since several of the polymer processing steps of the slurry method can be avoided. Briefly, the solution method involves polymerizing the alpha-olefin in a suitable solvent, e.g., xylene, at about 120-160° C. at which conditions the polymer is soluble in the solvent medium. After a solvent-extraction purification step with, for example, water, to remove catalyst residues, the solution is evaporated by being fed directly to a devolatilizer or similar evaporation chamber in which the solvent is expeditiously removed. The polymer is thus obtained molten and can then be extruded directly to pellet form in a conventional manner. This process by-passes the expensive and awkward steps of the usual process of centrifuging, inefficient water-washing, flash-drying, and remelting, with their attendant possible corruptions of polymer purity and degradation.

Despite the overall advantages of the above-indicated solution polymerization process over the more conventional slurry process, the solution process does not provide for a convenient removal of the undesirable polymer fractions. It would therefore be desirable to provide an efficient means for separating polymer fractions while the polymer is dissolved in solution.

Accordingly, it is an object of the present invention to provide an efficient and effective means for separating relatively low molecular weight polymer fractions from relatively high molecular weight polymer fractions while both fractions are mutually dissolved in a solvent for the polymer, and to efficiently recover the high molecular weight fraction.

A further object is to provide a method for treating a solution effluent from a solution polymerization process so as to provide in one step a solution containing principally the molecular weight fraction of polymer desired essentially free of undesirable molecular weight fractions.

Several methods for fractionation of olefin polymers or removal of amorphous fractions therefrom have been proposed. Thus, in U.S. 2,837,504 a method is taught which involves heating a solution of a normally solid olefin polymer in a paraffin or naphthene solvent until a phase separation results providing a polymer-rich phase and a solvent-rich phase. Polymer may then be recovered from the polymer-rich phase having less of the originally present lower molecular weight polymer. In U.S. 2,845,410 is described a method for separating an olefin polymer into oily, tacky and normally solid fractions which involves sequentially contacting the polymer with isobutane which produces an isobutane-rich phase (containing the oily fraction) and a polymer-rich phase, and then contacting the polymer-rich phase with a 7 to 9 carbon-atom hydrocarbon which provides a tacky fraction-rich phase and a normally solid polymer-rich phase. The desirable polymer is then recovered from the latter phase. Another method, as taught in U.S. 2,946,779, is to mix an olefin polymer with a monocyclic aromatic hydrocarbon at 90–145° C. to form a polymer gel, and then add an at least 6 carbon aliphatic hydrocarbon to break the gel structure and recover the undissolved polymer (higher molecular weight). A yet further method is taught in U.S. 2,945,016 which involves contacting a solution of an olefin polymer in a naphthenic hydrocarbon with a paraffinic hydrocarbon at a temperature at least as high as the upper cloud point of the polymer in the combined solvents which causes separation into a solvent-rich phase (containing lower molecular weight polymer) and a polymer-rich phase (containing higher molecular weight material).

In accordance with the present invention, an olefin polymer while dissolved in solvent for said polymer is fractionated into two fractions, one fraction rich in relatively low molecular weight polymer and the other fraction rich in relatively high molecular weight polymer, by a method which comprises intimately mixing with a solution of a normally solid olefin polymer comprised of amorphous and crystalline components of varying molecular weight (1) a lower alkyl monohydric alcohol, including glycol monoalkyl ethers and (2) a polyhydric alcohol including polyalkylene oxide glycols that are mutually soluble with said lower alkyl alcohols and said glycol monoalkyl ethers; forming two phases from said mixed materials; separating said phases and subsequently recovering the polymeric components therefrom.

In another aspect of the invention a third component, water, may be included with the monohydric and polyhydric alcohols and intimately mixed with the polymer solution.

The polymers treated in accordance with the present invention are, generally, polymers formed from any ethylenically unsaturated monomeric hydrocarbon. Advantageously and beneficially, the polymers treated in the practice of the invention are those formed from polymerized olefins including both mono- and di-olefins of aliphatic olefins such as ethylene, propylene, butylene and butadiene (including polymerizable mixtures thereof), and olefins containing an aryl or cyclic nucleus such as styrene, alpha-methyl styrene, para-methyl styrene, ortho- and para-chlorostyrene, dichlorostyrene, etc., and particularly the alpha- or 1-olefins which are so-designated because of their terminally unsaturated configuration.

In a preferred embodiment of the invention, solutions are treated containing the polyolefin polymers prepared by polymerization of monoolefinic aliphatic olefin monomers, such as ethylene, propylene, butylene and so forth (including polymerizable mixtures thereof) that contain from 2 to about 8 carbon atoms. These polymers of ethylene, propylene and other non-aromatic hydrocarbon olefins may be obtained under relatively low pressures of 1 to 100 atmospheres suing such catalysts for polymerizing the ethylene or other olefin with mixtures of compounds of Group IV–B, V–B, and VI–B metals of the periodic system with the co-catalyst materials commonly designated as strong reducing agents. These polymer solutions are frequently obtained by polymerizing the mono-olefins in an inert solvent preferably a hydrocarbon solvent, which may suitably be a 3 to 12 carbon atom paraffinic or aromatic hydrocarbon solvent, such as hexane, cyclohexane, and advantageously benzene, toluene, xylene n-hexane, n-heptane, and mixtures of aliphatic solvents of the type described.

It is to be understood that the present invention is concerned with upgrading polymer products regardless of the source of the polymer.

The concentration of the polymer in solvent that is mixed with the monohydric and polyhydric alcohols will depend upon the type of polymer and solvent involved as well as the source of the solution. For instance, if the polymer solution is obtained directly from a polymerization process, chances are it will contain from about 2 to about 30 weight percent polymer solids. Generally, the concentration of the polymer solution is not critical and any concentration can be employed. Preferably, relatively dilute solutions are utilized, e.g., between about 5 and 15 weight percent polymer solids.

Any solvent which is a solvent for the olefin polymer may be used to dissolve the olefin polymer to be treated. Ordinarily, these comprise 4 to about 10 carbon-atom aliphatic and cyclic paraffins such as butane, hexane, isohexane, octane, cyclohexane, methyl cyclohexane, etc. and aromatic hydrocarbons such as benzene, toluene and xylenes. Other such solvents having an atmospheric boiling temperature of about 100° C. or greater but below about 220° C. are satisfactorily employed. Preferably, xylene, which may be the ordinary commercial mixture of o-, m- and p-xylenes or n-heptane, n-hexane or mixtures of aliphatic solvents of the indicated variety are employed for the olefin polymer solvent.

The monohydric alcohol employed in the mixture of treating agents to facilitate fractionation of the olefin polymer is beneficially and advantageously a lower alkyl alcohol, i.e., a 1 to about 8 carbon-atom alkanol. Thus, exemplary of such monohydric alcohols are methanol, ethanol, isopropanol, n-butanol, iso-amyl alcohol, etc. and mixtures thereof. Methanol is profitably utilized to this end.

As indicated, the monohydric alcohol can be a monhydric glycol ether. Such glycol ethers are generally selected from 1 to about 4 carbon-atom alkyl ethers of 2 to about 4 carbon-atom glycols or polyalkylene glycols of molecular weight up to about 300 or so, such as ethylene glycol methyl ether, ethylene glycol ethyl ether, diethylene glycol n-butyl ether, dipropylene glycol methyl ether, and tripropylene glycol methyl ether and mixtures thereof.

The polyhydric alcohol constituent of the polymer-fractionating treating agent is preferably a lower 2 to about 4 carbon-atom polyhydric alcohol such as ethylene, propylene, and butylene glycols and glycerol. Ethylene glycol is employed with particular advantage from the standpoint of efficiency and ready availability at low cost.

Other polyhydric alcohols of the polyalkylene oxide type having a molecular weight up to about 600 wherein the alkylene unit is a 2 to about 3 carbon-atom akyl may also be utilized in the practice of the invention. These alkylene oxide glycols may be generally represented by the formulae:

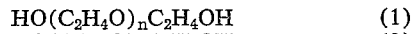
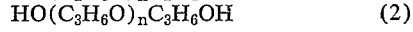

$$HO(C_2H_4O)_nC_2H_4OH \qquad (1)$$
$$HO(C_3H_6O)_nC_3H_6OH \qquad (2)$$

wherein $n$ is a positive interger of 1 to about 12. Thus, included among these alkylene oxide glycols are diethylene and dipropylene glycol, triethylene and tripropylene glycol, tetraethylene and tetrapropylene glycol, etc.

Because the operation of the present invention is somewhat complex in that several of the variables are interrelated and interdependent, it is not possible at this time to specifically describe the exact proportions and kind of treating agents that are best suited for every particular polymer and polymer solution. However, the necessary determinations can be adequately set forth to provide one skilled in the art with the criticalities needed to practice the full scope of the invention. For example, the amount and type of polymer to be extracted from a given product will depend upon the average molecular weight of the polymer, the distribution of molecular weights, and the degree of crystallinity or isotacticity of each molecular weight fraction. Once determination is made of the extraction to be accomplished, there are still many choices as to how it may be best accomplished. For instance, the concentration of the polymer in the solvent, and the characteristics of the solvent will affect the choice of the monohydric and polyhydric alcohols, and the amounts of each to be used. A range of temperatures will always be operable, but the selection of an optimum temperature will depend on the other choices made, and vice versa, as well as upon considerations of convenience in connection with previous and subsequent processing operations.

Generally, rather broad proportionate ranges of the liquid constituents (excluding the dissolved polymer solids) can be employed in the present polymer fractionation process. In most cases, the polymer solvent is present in the largest proportion but it is not necessarily so. With respect to the liquid composition weight, for example, from about 20 to 80 percent can be polymer solvent with the remainder being from about 10 to 40 percent monohydric alcohol and from about 10 to about 40 percent polyhydric alcohol. Additionally, as indicated a fourth liquid component, water, may be employed with advantage in the practice of the invention. The amount of water that may be beneficially employed will vary somewhat with the three-component liquid composition in use, but up to about 20 or so weight percent water can usually be tolerated without adversely affecting the polymer fractionation efficiency.

In order to more particularly point out the concentration effect of the liquid constituents when the present invention is carried out, by way of example, reference is made to a polypropylene polymer dissolved in xylene and treated with a system of methanol (monohydric alcohol) and ethylene glycol (polyhydric alcohol). Referring now to FIGURE 1 of the drawing, there is represented a phase diagram of a xylene (containing from 1 to 5 weight percent dissolved polypropylene)-methanol-ethylene glycol system at 140° C., wherein concentrations are in weight percent. For this particular system, the proportionate concentration range that is operable for carrying out the invention is enclosed within the area ABC in the phase diagram of FIGURE 1. Thus, the overall operable range for this particular system of liquids and typical polypropylenes is about 22–76 weight percent xylene, 8–39 weight percent ethylene glycol, and 12–39 weight percent methanol, based on the weight of the liquid components, i.e., excluding the weight of polypropylene present. The area D in FIGURE 1 represents concentrations wherein the polymer phase is high in polymer, i.e., little or no extraction of polymer in the grease-molecular weight range. In the area E of FIGURE 1, the glycol to methanol ratio is too high to remove any appreciable amount of grease. No phasing occurs in area F of FIGURE 1 which may be a result of a true one-phase solution or a two-phase solution in which the phases have almost identical densities.

Concentration variations within the operable composition area ABC can be adjusted to account for variations in the polymer or polymer solution. Thus, referring to FIGURE 2 wherein the area ABC represents the same concentration ranges as the area ABC in FIGURE 1, the directional arrow $a$ indicates the direction of increasing efficiency of grease removal from the propylene polymer in accordance with the invention with changes in concentration of the liquid components in the xylene-methanol-glycol system.

Figure 2:
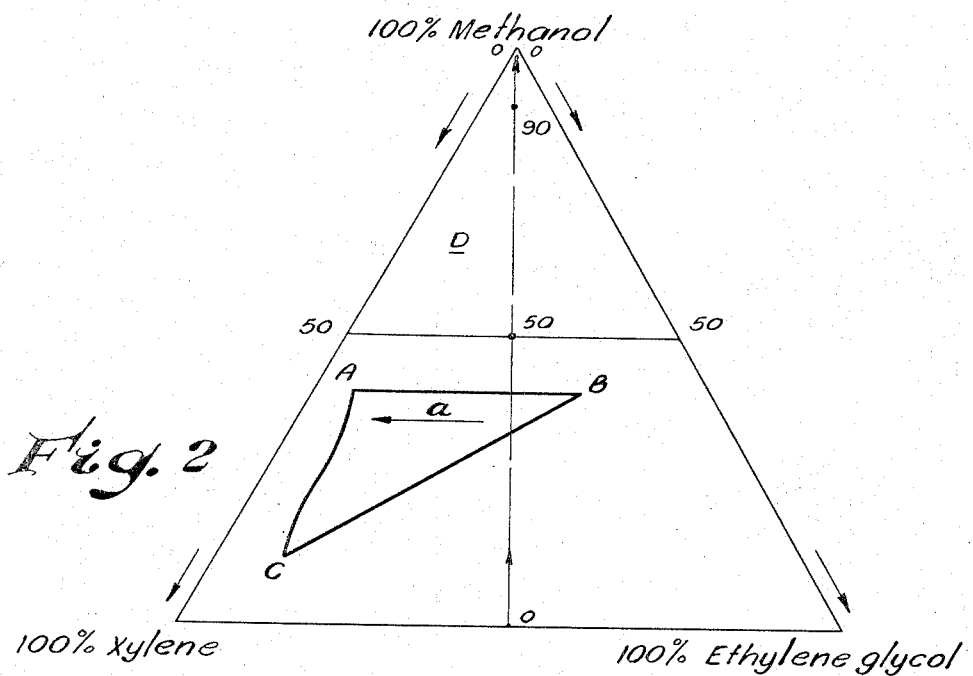

Beneficially, for the particular xylene-methanol-ethylene glycol system depicted in FIGURES 1 and 2, for overall efficiency for the purposes of fractionating the polymer and removal of any other deleterious material, a liquid composition of about 50–55 weight percent xylene, about 35–39 weight percent methanol and about 8–13 weight percent ethylene glycol is employed in the instant polymer up-grading method.

According to the foregoing teaching, specific and advantageous concentrations of other of the herein-indicated liquid compositions can be readily ascertained for practice within the scope of the present invention.

The temperature that is best employed for the fractionation will depend primarily on the solubility of the particular olefin polymer in the chosen solvent. A temperature such as to permit a polymer at least up to about 100,000 molecular weight to be substantially all dissolved in the solvent should be employed. In the case of any partially crystalline polymer, this temperature approaches, but does not reach, the crystalline melting point of the polymer. The nearness of approach required is determined, in the main, by the solvent power of the solvent for the polymer. For example, with excellent solvents for polypropylene like the xylenes, 115° C. represents a minimum operable temperature. If less powerful solvents should be employed, as for example, n-heptane, a higher temperature is required. The upper temperature is limited by convenience in operating the process, as well as by conditions of solvent interactions such as increasing mutual miscibility of the liquid components with increasing temperature. As a result, it is usually advantageous to operate within about 40° C. of the minimum solubility temperature. With polypropylene it is advantageous to operate between about 125° C. and about 145° C.

Under these temperature conditions, superatmospheric pressures are very frequently encountered due principally to the vapors of both the polymer solvent and the monohydric alcohol. The polyhydric alcohol (and water) may or may not contribute much to the total pressure. In any case, it is usually necessary to maintain a closed system under whatever pressure is generated to prevent composition changes due to preferential volatilization of one or more components.

The order in which the monohydric and polyhydric alcohols are added to the polymer solution is not particularly critical. Thus, either may be added followed by the other, or, they can be first mixed with one another and the mixture added to the polymer solution. It is preferred to operate in a continuous fashion. Thus, the solution of polymer and the two nonsolvents, i.e., monohydric and polyhydric alcohols, are preferably fed simultaneously to an agitated vessel or other suitable mixing vessel following which the separate phases may be drawn directly from the mixing vessel or more beneficially, a dispersed mixture of the two phases may be transferred to a separate vessel where complete separation and removal of phases may be accomplished. The process may, of course, be operated in batch fashion with separate portions of the polymer solution being treated individually. Any conventional form of liquid-liquid contacting equipment may be used in carrying out the process of the present invention. Among the suitable types of equipment are rotating-disk contactors and continuous mixer-settler systems, the latter of which is conveniently employed.

The necessary time in which the mono- and polyhydric alcohols are in contact with the polymer solution before phase separation depends mainly on the mixing efficiency and to a lesser degree on the amount of polymer to be removed. Ordinarily, a contact time of 10 to 20 minutes is sufficient although shorter and certainly longer times can be utilized.

Phase separation can be effected by any conventional method such as by gravity in a quiet zone following the contactor-mixer. Where specific gravity differences between the phases warrants, such expediting means as centrifuging can be used to separate the phases.

Recovery of the polymer solids from either or both phases can be accomplished by addition of non-solvent causing the polymer to precipitate, or by evaporation of solvent or any other suitable means.

In order to further illustrate the invention, the following examples are presented wherein, unless otherwise specified, all parts and percentage are by weight.

Example 1

To a 10 liter closed stirred stainless steel kettle capable of operation at up to about 200° C. and 750 p.s.i.g. were added 2 liters of xylene, 0.6 liter of ethylene glycol, and 2.4 liters of methanol. This mixture was brought to a temperature of 140° C., with stirring, after which was added from an external vessel, also held at 140° C., 2.24 liters of a xylene solution containing 111.8 grams of dissolved polypropylene previously prepared and dissolved therein.

The added polymer solution was 6.64% by weight polypropylene. The polymer had previously been analyzed as follows: grease—6.72%, wax—8.62%, average molecular weight—485,000. The polymer solution was prepared by polymerizing propylene in xylene solution with a catalyst prepared from $TiCl_3$ and $AlEt_3$ at 140° C. The resulting four-component (including polypropylene as one component) two-phase mixture comprised in percents by weight, xylene—55.2, glycol—11.2, methanol—31.8, and polypropylene—1.87. It was agitated at 1500 r.p.m. for 15 minutes, and was then allowed to settle for 1.0 hour, all while being maintained at about 140° C. At this time, two distinct phases resulted and were separately sampled for analysis.

The sample of the methanol-glycol lower phase was washed with concentrated HCl, followed by a large excess of distilled water, in several portions. Any solid then present in the remaining xylene was filtered off, washed with acetone, dried, and weighed as crystalline polypropylene. The filtrate, a xylene solution of the grease which was extracted from the main body of the polymer, was also analyzed. One portion was evaporated to determine the total grease plus wax content. Another portion was mixed with an equal volume of isopropanol, thereby precipitating the wax fraction, which was filtered and discarded. The resulting filtrate was evaporated to determine the amount of grease which had been removed from the polymer. Wax removal was determined by difference.

The upper, xylene-rich phase contained the major part of the polypropylene originally present. At room temperature, it was largely present as a disperse solid phase suspended in the xylene. From one portion, total solids present were recovered by evaporation of the xylene.

Another portion of the upper phase was filtered, and the residue of purely crystalline polymer was washed twice with xylene to completely remove all grease and wax therefrom. The filtrate was then analyzed for both grease and wax content as described above for the lower-phase analysis.

The lower extractant phase was 49.5% xylene, and contained 0.638 gram per liter of grease, and 0.544 gram per liter of crystalline waxy polymer, of molecular weight less than 10,000.

The upper xylene-rich phase contained 20% by weight of polypropylene of 465,000 molecular weight containing 2.62% grease and 3.78% wax.

Thus treatment of the polymer removed 60% of the grease and 56% of the wax originally present.

Example 2

In a continuous mixer-settler apparatus operating at 140° C. were fed simultaneously two liquid streams having the following compositions:

Stream 1: 10.8 gallons per hour (g.p.h.) of a xylene solution containing 9.4% by weight of a polypropylene of 218,000 average molecular weight of which about 15% by weight of total polymer was grease plus wax fractions. This corresponded to a polymer feed rate of about 6.63 pounds per hour.

Stream 2: An extractant mixture of 6.75 gallons per hour of xylene and 6.0 gallons per hour of a 40 volume percent ethylene glycol, 60 volume percent methanol mixture (overall volume composition of Stream 2 was about 53% xylene, 28% methanol, 19% glycol).

The two streams were intimately and vigorously mixed in the mixer stage for an average residence time of about twenty minutes. At this stage, on a volume basis, the composition of the combined streams was about 74% xylene, 15.7% methanol, 10.3% glycol, exclusive of the roughly 2 volume percent polymer. From the settling stage of the equipment 17.4 gallons per hour of extractant phase, composed, in volume percents, of 64.3% xylene, 22.1% methanol, and 13.8% glycol were recovered. The grease and wax content of this extractant phase was 0.82 gram per liter, or 0.116 pound per hour, corresponding to the removal of 1.75 weight percent of the original polymer. The polymer recovered from the upper phase contained 13.1 weight percent grease plus wax, and was significantly improved as evidenced from the fact that it was not tacky to the touch after exposure in boiling water for two hours.

In contrast, when polymer recovered directly from Stream 1, and not treated according to the foregoing, was immersed in boiling water for 2 hours it exhibited pronounced surface tackiness, and was, for most purposes, unacceptable.

Example 3

Following the same general procedure as Example 2, a 7% solution of polymer of 254,000 average M.W. was fed at 10.8 g.p.h. (4.94 lb./hr.), together with 6.75 g.p.h. xylene, 3.72 g.p.h. methanol, and 2.48 g.p.h. ethylene glycol to the mixer-settler apparatus. After mixing and settling, 17.8 g.p.h. extractant was recovered, composed of 68.4 volume percent xylene, 18.0 volume percent methanol, and 13.5 volume percent glycol, and containing 1.03 grams per liter, or 0.149 pounds per hour grease plus wax. A net removal of about 3.0 weight of the polymer was effected as determined by analysis. The recovered polymer product from the upper phase contained about 11.0 weight percent grease plus wax.

Example 4

Five different polymer solutions of polypropylene dissolved in xylene were made available for treating in accordance with the present invention having the compositions set forth in Table I. For convenience, the polymer solutions as described in Table I will be referred to as A, B, C, D and E in Examples 5, 6 and 7.

TABLE I

| | Polymer Solution | | | | |
|---|---|---|---|---|---|
| | A | B | C | D | E |
| Wt. percent Polymer in Solution | ca. 5 | 4.65 | 6.64 | 9.72 | 6.0 |
| Total Grams Polymer used in Treatment | ca. 84 | 78.5 | 111.8 | 164 | 100 |
| Wt. percent Grease in Polymer | ca. 5.6 | 4.10 | 6.72 | 5.51 | 6.1 |
| Wt. percent Wax in Polymer | ca. 3.9 | 25 | 8.62 | 7.02 | 7.2 |
| M.W.×10⁻³ of Polymer | 402 | 231 | 485 | 318 | 395 |

Example 5

Polymer solutions of Table I were treated following the general procedure of Example 1 excepting to employ various treating temperatures and various proportions of xylene, methanol and ethylene glycol. In each sample, the settling time was ½ hour. The results are set forth in Table II.

Example 6

Poly solutions of Table I were treated following the general procedure of Example 1 excepting to employ various proportions of xylene, methanol and ethylene glycol, and to employ various settling times, and additionally, in some instances, to add water as a fourth liquid component. In each sample a treating temperature of 140° C. was employed. The results are set forth in Table III.

TABLE II

| Polymer Solution | Xylene, liters | Glycol, liters | Methanol, liters | Wt. Percent of Total ||||
|---|---|---|---|---|---|---|---|
| | | | | Xylene | Glycol | Methanol | Polymer |
| A | 2 | 1.5 | 1.5 | 53.1 | 26.6 | 19.0 | 1.35 |
| A | 2 | 1.5 | 0.75 | 58.6 | 29.4 | 10.5 | 1.49 |
| A | 0 | 2 | 1 | 34.1 | 47.3 | 16.8 | 1.79 |
| A | 0 | 1 | 2 | 42.2 | 21.3 | 34.2 | 2.3 |
| A | 0 | 0.5 | 1.5 | 52 | 13.4 | 31.7 | 2.94 |
| B | 0 | 2 | 1 | 34.2 | 47.3 | 16.8 | 1.67 |
| B | 0 | 0.5 | 2.5 | 38.1 | 13.2 | 46.9 | 1.86 |

| Polymer Solution | Temp., °C. | Extractant Phase |||||| Polymer Phase |||||
|---|---|---|---|---|---|---|---|---|---|---|---|---|
| | | Grease, g./l. | Wax, g./l. | Cryst. Polymer, g./l. | Grease Wax:Cryst. Polymer | Volume Percent Xylene | M.W.×10⁻³ of Cryst. Polymer | Percent Polymer | Percent Grease in Polymer || Percent Wax in Polymer || M.W.×10⁻³ of Product |
| | | | | | | | | | Before | After | Before | After | |
| A | 140 | 0.500 | 0 | 0.063 | 1:0:0.08 | 51 | | | | | | | |
| | 160 | 0.658 | 0 | 0.180 | 1:0:0.37 | 57 | | | | | | | |
| | 180 | 1.39 | 0 | 0.620 | 1:0:0.44 | 58 | | | | | | | |
| A | 140 | 0.011 | 0 | 0 | 1:0:0 | 11 | | | | | | | |
| | 160 | 0.060 | 0 | 0 | 1:0:0 | 18.5 | | | | | | | |
| | 180 | 2.40 | 0.70 | 8.19 | 1:0.29:3.4 | 76 | | | | | | | |
| A | 140 | 0.027 | 0 | 0 | 1:0:0 | 19.6 | | | | | | | |
| | 160 | 0.40 | 0 | 0 | 1:0:0 | 28.9 | | | | | | | |
| | 180 | 0.97 | 0 | 0 | 1:0:0 | 34.9 | | | | | | | |
| | 200 | 1.93 | 0 | 0 | 1:0:0 | 35.1 | | | | | | | |
| A | 140 | 0.35 | 0 | 0 | 1:0:0 | 35.0 | | | | | | | |
| A | 140 | 0.67 | 0 | 0 | 1:0:0 | 43.0 | | | ~5.6 | 4.8 | ~3.9 | 3.0 | 375 |
| B | 140 | 0.025 | 0 | 0 | 1:0:0 | 16.4 | | | ~5.6 | 2.3 | ~3.9 | 2.6 | 376 |
| | 160 | 0.032 | 0 | 0 | 1:0:0 | 21.1 | | | | | | | |
| | 180 | 0.19 | 0 | 0 | 1:0:0 | 41.8 | | | | | | | |
| | 200 | 0.38 | 0 | 0 | 1:0:0 | 45.1 | | | | | | | |
| B | 140 | 0.196 | 0 | 0 | 1:0:0 | 35.7 | | | | | | | |
| | 160 | 0.193 | 0 | 1.77 | 1:0:9.2 | 33.8 | 230 | | | | | | |
| | 180 | 0.374 | 0.166 | 6.47 | 1:0.44:17.3 | 34.6 | 251 | | | | | | |

TABLE III

| Polymer Solution | Xylene, liters | Glycol, liters | Methanol, liters | Water, ml. | Settling time (hr.) | Extractant Phase |||
|---|---|---|---|---|---|---|---|---|
| | | | | | | Grease, g./l. | Wax, g./l. | Cryst. Polymer, g./l. |
| B | 2 | 0.5 | 1.5 | 0 | 1 | (¹) | (¹) | (¹) |
| B | 2 | 1 | 2 | 0 | 1 | 0.285 | 0.0376 | 0.0196 |
| C | 2 | 0.8 | 2 | 0 | 0.5 | 0.513 | 0 | 0.392 |
| C | 0 | 0.5 | 2.5 | 0 | 1 | 0.249 | 0 | 0.319 |
| C | 1 | 1 | 3 | 0 | 1 | 0.208 | 0 | 0.0090 |
| C | 2 | 0.8 | 2.4 | 0 | 1 | 0.568 | 0 | 0.314 |
| C | 1 | 0.4 | 1 | 0 | 1 | (²) | (²) | (²) |
| C | 1 | 0.4 | 1 | 0 | 1 | 1.50 | 0.394 | 3.58 |
| C | 1 | 0.5 | 1.5 | 0 | 1 | 0.818 | 0 | 0.644 |
| C | 2 | 0.5 | 1 | 0 | 1 | 1.20 | 0.545 | 4.21 |
| C | 2 | 0.6 | 2.4 | 0 | 1 | 0.638 | 0 | 0.544 |
| C | 2 | 0.95 | 2 | 50 | 0.5 | 0.524 | 0 | 0.195 |
| C | 1.75 | 0.57 | 1.5 | 30 | 0.5 | 0.770 | 0 | 0.654 |
| D | 1.75 | 0.6 | 1.5 | 0 | 0.5 | 0.859 | 0 | 0.810 |
| D | 1.75 | 0.48 | 1.5 | 120 | 0.5 | 0.621 | 0 | 0.311 |
| D | 2 | 0.76 | 2.4 | 40 | 0.5 | 0.497 | 0 | 0.130 |
| D | 2 | 0.57 | 2.4 | 30 | 1 | 0.626 | 0 | 0.266 |
| D | 1 | 0.475 | 1.5 | 25 | 1 | 1.11 | 0 | 0.387 |
| D | 2 | 0.475 | 1 | 25 | 0.5 | 1.69 | 0.589 | 1.79 |
| D | 2 | 0.556 | 2 | 0 | 1 | 0.764 | 0 | 0.601 |
| D | 1 | 0.38 | 1 | 20 | 1 | 1.18 | 0 | 0.79 |
| D | 1 | 0.5 | 1 | 0 | 0.5 | 1.01 | 0 | 0.623 |
| D | 2 | 0.4 | 0.8 | 0 | 1 | (²) | (²) | (²) |
| D | 2 | 0.6 | 1 | 0 | 0.5 | 1.36 | 0.197 | 0.798 |

See footnotes at end of table.

TABLE III—Continued

| Polymer Solution | Extractant Phase | | Polymer Phase | | | | | |
| --- | --- | --- | --- | --- | --- | --- | --- | --- |
| | Volume Percent Xylene | M.W. of Cryst. Polymer X10⁻³ | Percent Polymer | Percent Grease in Polymer | | Percent Wax in Polymer | | M.W.X10⁻³ of Product |
| | | | | Before | After | Before | After | |
| B | (¹) 53.7 | (¹) 127 | (¹) 23 | (¹) 4.10 | (¹) 1.69 | (¹) 25 | (¹) 13 | (¹) 262 |
| B | 50.0 | 11.8 | 22 | 6.72 | 2.31 | 8.62 | 3.90 | 503 |
| C | 36.4 | <10 | High | 6.72 | 3.92 | 8.62 | 6.68 | 430 |
| C | 38.9 | | High | 6.72 | 4.02 | 8.62 | 5.46 | 435 |
| C | 50.5 | 15 | 24 | 6.72 | 3.86 | 8.62 | 5.78 | 495 |
| C | (²) 61.4 | (²) 36 | (²) 8 | (²) 6.72 | (²) 3.58 | (²) 8.62 | (²) 5.65 | (²) 533 |
| C | 52.3 | <10 | 23 | 6.72 | 4.04 | 8.62 | 5.24 | 485 |
| C | 63.7 | 46 | 5 | 6.72 | 2.49 | 8.62 | 3.72 | 544 |
| C | 49.5 | <10 | 20 | 6.72 | 2.62 | 8.62 | 3.78 | 465 |
| C | 54.0 | 16.8 | 21 | 6.72 | 4.56 | 8.62 | 4.42 | 450 |
| C | 55.4 | <10 | 23 | 6.72 | 2.91 | 8.62 | 6.09 | 470 |
| D | 55.8 | <10 | 21 | 5.51 | 3.80 | 7.02 | 6.06 | 455 |
| D | 55.7 | <10 | 22 | 5.51 | 2.81 | 7.02 | 6.43 | 490 |
| D | 47.7 | <10 | 25 | 5.51 | 1.64 | 7.02 | 7.90 | 421 |
| D | 48.9 | <10 | 28 | 5.51 | 4.37 | 7.02 | 5.99 | 440 |
| D | 51.0 | 10.5 | 28 | 5.51 | 2.15 | 7.02 | 7.35 | 430 |
| D | 60.8 | 15.7 | 9 | 5.51 | 3.95 | 7.02 | 6.21 | 470 |
| D | 53.2 | 10.5 | 28 | 5.51 | No data | 7.02 | No data | 391 |
| D | 58.3 | <10 | 14 | 5.51 | 4.94 | 7.02 | 4.74 | 447 |
| D | 48.6 | 12.7 | 18 | 5.51 | 3.67 | 7.02 | 6.14 | 419 |
| D | (²) 54.0 | (²) 14.2 | (²) 11 | (²) 5.51 | (²) 4.32 | (²) 7.02 | (²) 5.10 | (²) 471 |

¹ No phasing.
² Partial phasing.

*Example 7*

Polymer solutions of Table I were treated following the general procedure of Example 1 excepting to employ other monohydric and polyhydric alcohols within the scope of the present invention. The settling time for each sample was ½ hour. These results are set forth in Table IV.

TABLE IV

| Polymer Solution | Liters Xylene | Liters Other Extractants | Agitation Temp., °C. | Settling Temp., °C. |
| --- | --- | --- | --- | --- |
| E | 1.0 | 1.5 Propylene glycol plus 2 propylene glycol methyl ether. | 140-143 | 143-147 |
| | | | 175-170 | 170-173 |
| E | 2.0 | 1 Propylene glycol plus 1 propylene glycol methyl ether. | 140 | 140 |
| | | | 160 | 160 |
| | | | 180 | 180 |
| E | 2.0 | 1 Ethylene glycol plus 2 diethylene glycol methyl ether. | 140 | 140-145 |
| | | | 160 | 160 |
| | | | 180 | 180 |
| E | 2.0 | 0.5 Propylene glycol plus 1.5 diethylene glycol methyl ether. | 140 | 140-145 |
| E | 2.0 | 1.0 Propylene glycol plus 1.5 diethylene glycol methyl ether. | 160 | 160-163 |
| A | 2.0 | 1.0 Propylene glycol plus 1 propylene glycol methyl ether. | 140 | 140-145 |
| A | 2.0 | 1.0 Propylene glycol plus 1 propylene glycol methyl ether plus 0.5 ethylene glycol. | 140 | 140 |
| | | | 160 | 160-164 |
| A | 2.0 | 2 Ethylene glycol plus 1 butanol | 140 | 140-144 |
| | | | 163-157 | 157-162 |
| | | | 180 | 180-187 |
| A | 2.0 | 1.5 Ethylene glycol plus 1.5 butanol | 140-138 | 138-145 |
| | | | 160 | 160-165 |
| A | 2.0 | 1.5 Ethylene glycol plus 1.5 isopropyl alcohol | 140 | 140 |
| | | | 160 | 160 |
| | | | 180 | 180 |
| A | 0 | 2 Ethylene glycol plus 1 isopropyl alcohol | 140 | 140 |
| | | | 160 | 160 |
| | | | 180 | 180 |
| | | | 200 | 200 |
| B | 0 | 1.5 Ethylene glycol plus 1.5 butanol | 140 | 140 |
| | | | 160 | 160 |
| | | | 180 | 180 |
| | | | 200 | 200 |

TABLE IV—Continued

| Polymer Solution | Extractant Phase | | | | | |
|---|---|---|---|---|---|---|
| | Grease, g./l. | Wax, g./l. | Crystalline Polymer, g./l. | Wt. Ratio of Grease:Wax: Cryst. Polymer | Volume Percent Xylene | M.W.×10⁻³ of Crystalline Polymer |
| E | 0.74 | 0 | 0.59 | 1:0:0.8 | 44 | 12.5 |
|   | 1.26 | 0.02 | 2.41 | 1:.015:1.9 | 44 | 23 |
| E | 0.95 | 0 | 0.353 | 1:0:0.37 | 54 | 20 |
|   | 1.42 | 0.08 | 0.34 | 1:.056:0.24 | 54.5 | 31 |
|   | 1.21 | 1.21 | 1.97 | 1:1:1.63 | 53 | 54 |
| E | 0.695 | 0 | 0.347 | 1:0:0.5 | 58 | |
|   | 0.885 | 0 | 0.525 | 1:0:0.59 | 55 | |
|   | 1.22 | 0 | 1.52 | 1:0:1.24 | 54 | |
| E | (¹) | (¹) | (¹) | (¹) | (¹) | (¹) |
| E | 1.43 | 0.62 | 4.9 | 1:0.62:7.2 | 62 | 122 |
| A | (¹) | (¹) | (¹) | (¹) | (¹) | (¹) |
|   | 4.28 | 0.283 | 2.33 | 1:.066:.54 | 63 | 47 |
|   | 5.32 | 1.37 | 9.03 | 1:39:1.7 | 64 | 160 |
|   | 0.603 | 0 | 0 | 1:0:0 | 16 | |
|   | 1.90 | 0 | 0 | 1:0:0 | 22 | |
|   | 8.85 | 0.126 | 10.4 | 1:.014:1.18 | 64.5 | 113 |
| A | 1.28 | 0 | 2.76 | 1:0:2.15 | 54.5 | 20.5 |
|   | 2.06 | 0 | 2.82 | 1:0:1.37 | 55.5 | |
|   | 0.50 | 0 | 0.063 | 1:0:0.08 | 51 | |
|   | 0.658 | 0 | 0.180 | 1:0:0.37 | 57 | |
|   | 1.39 | 0 | 0.620 | 1:0:0.44 | 58 | |
| A | 0.015 | 0 | 0 | 1:0:0 | 15.2 | |
|   | 0.24 | 0 | 0.030 | 1:0:0.125 | 33.0 | |
|   | 0.54 | 0 | 0.044 | 1:0:0.082 | 39.9 | |
|   | 0.82 | 0 | 0.263 | 1:0:0.32 | 38.8 | |
| B | 0.167 | 0 | 0.0028 | 1:0:0.017 | 31.8 | |
|   | 0.187 | 0 | 0.0156 | 1:0:0.083 | 33.1 | 25 |
|   | 0.262 | 0 | 0.0684 | 1:0:0.26 | 32.2 | 74 |
|   | 0.478 | 0.089 | 0.439 | 1:0.19:0.92 | 34.4 | 142 |

¹ No Phasing.

Similar excellent results are obtained when other olefin polymers are treated with other monohydric and polyhydric alcohols in accordance with the present invention.

It is to be understood that the present invention is not to be restricted to the specific delineations hereinbefore set forth, but it is to be construed in light of the hereto appended claims.

What is claimed is:

1. Method for fractionating a hydrocarbon olefin polymer dissolved in a solvent for said polymer which comprises intimately contacting said polymer solution in a closed system at a temperature sufficient to maintain substantially all of the polymer dissolved in the solution with
  (1) a monohydric alcohol selected from the group consisting of:
    (a) a 1 to about 8 carbon-atom alkanol,
    (b) a monoalkyl ether of a 2 to about 4 carbon-atom glycol wherein the alkyl radical of the ether group contains from 1 to about 4 carbon-atoms,
    (c) a monoalkyl ether of a polyalkylene glycol of molecular weight up to about 300, wherein the alkylene radical contains from 2 to about 4 carbon atoms, and the alkyl radical of the ether group contains from 1 to about 4 carbons atoms, and
    (d) mixtures of (a), (b) and (c), and
  (2) a polyhydric alcohol selected from the group consisting of:
    (a) a 2 to about 4 carbon-atom polyhydric alkanol,
    (b) an alkylene oxide gylcol of the formulae:

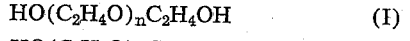

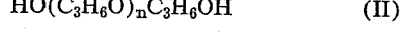

wherein $n$ is a positive integer of 1 to about 12, and mixtures of (a) and (b); forming two phases; separating said phases and subsequently recovering polymer therefrom; wherein, based upon liquid composition weight, the amount of said solvent is from about 20 to 80 percent, the amount of said monohydric alcohol is from about 10 to 40 percent, and the amount of said polyhydric alcohol is from about 10 to 40 percent.

2. The method of claim 1, wherein said olefin polymer is a propylene polymer.

3. The method of claim 2, wherein said propylene polymer is polypropylene.

4. The method of claim 1, wherein said olefin polymer is polyethylene.

5. The method of claim 1, wherein said solvent for said polymer is xylene.

6. The method of claim 1, wherein said solvent for said polymer is a 4 to 10 carbon-atom aliphatic hydrocarbon.

7. The method of claim 1, wherein said monhydric alcohol is methanol and said polyhydric alcohol is ethylene glycol.

8. The method of claim 1, wherein water is added in addition to said monohydric and polyhydric alcohols for intimately contacting said polymer solution prior to forming said two phases.

9. Method for fractionating a 2 to about 8 carbon-atom aliphatic monoolefin polymer dissolved in a 6 to about 8 carbon-atom hydrocarbon aromatic solvent which comprises intimately contacting said polymer solution in a closed system at a temperature of from about 115 to 145° C. with methanol and ethylene glycol such that a liquid composition results, based on liquid composition weight, of between about 22 to 76 weight percent of said aromatic solvent, between about 12 to 39 weight percent methanol, and between about 8 to 39 weight percent ethylene glycol, said liquid composition falling within the ABCA of FIGURE 1; forming two phases; separating said phases and subsequently recovering polymer therefrom.

10. The method of claim 9, wherein said olefin polymer is a propylene polymer.

11. The method of claim 10, wherein said propylene polymer is polypropylene.

12. The method of claim 9, wherein said olefin polymer is polyethylene.

13. The method of claim 9, wherein said aromatic solvent is xylene.

14. The method of claim 9, wherein said aromatic solvent is xylene, said olefin polymer is polypropylene, said liquid composition comprises between about 50 to 55 weight percent xylene, between about 35 to 39 weight percent methanol and between about 8 to 13 weight percent ethylene glycol, and said contacting, forming and separating said two phases is performed at between about 125° to 145° C.

15. Method for upgrading polymers that have been prepared by polymerizing an olefin monomer in a hydrocarbon solvent that is solvent for the resulting olefin polymer at the polymerization conditions by fractionation of said olefin polymer and recovery thereof which comprises intimately contacting the polymer solution obtained from said polymeration in a closed system at a temperature sufficient to maintain substantially all of the polymer dissolved in the solution with
   (1) a monohydric alcohol selected from the group consisting of:
      (a) a 1 to about 8 carbon-atom alkanol,
      (b) a monoalkyl ether of 2 to about 4 carbon-atom glycol wherein the alkyl radical of the ether group contains from 1 to about 4 carbon atoms,
      (c) a monoalkyl ether of a polyalkylene glycol of molecular weight up to about 300, wherein the alkylene radical contains from 2 to about 4 carbon atoms, and the alkyl radical of the ether group contains from 1 to about 4 carbon atoms, and
      (d) mixtures of (a), (b) and (c), and
   (2) a polyhydric alcohol selected from the group consisting of:
      (a) a 2 to about 4 carbon-atom polyhydric alkanol,
      (b) an alkylene oxide glycol of the formulae:

$$HO(C_2H_4O)_nC_2H_4OH \qquad (I)$$

$$HO(C_3H_6O)_nC_3H_6OH \qquad (II)$$

wherein $n$ is a positive integer of 1 to about 12, and mixtures of (a) and (b); forming two phases consisting of a solvent-rich phase and an alcoholic-rich phase; separting the two phases and recovering from said solvent-rich phase said olefin polymer having significantly reduced amounts of lower molecular weight polymer than said polymer in said polymer solution.

16. The method of claim 15, wherein said olefin polymer is derived from an aliphatic unsaturated 2 to about 8 carbon-atom monoolefin.

17. The method of claim 16, wherein said monoolefin polymer is a propylene polymer.

18. The method of claim 17, wherein said propylene polymer is polypropylene.

19. The method of claim 15, wherein said monohydric alcohol is methanol and said polyhydric alcohol is ethylene glycol.

20. The method of claim 15, wherein water is added in addition to said monohydric and polyhydric alcohols for intimately contacting said polymer solution prior to forming said two phases.

21. The method of claim 15, wherein said temperature is between about 115 and 145° C. wherein said hydrocarbon solvent is a 6 to about 8 carbon-atom aromatic solvent, said olefin polymer is derived from a 2 to about 8 carbon-atom aliphatic monoolefin, said monohydric alcohol is methanol, and said polyhydric alcohol is ethylene glycol, and which solvent, monohydric and polyhydric alcohols are mixed in such proportions that a liquids composition results, based on liquid composition weight, of between about 22 to 76 weight percent of said aromatic solvent, between about 12 and 39 weight percent methanol, and between about 8 to 39 weight percent ethylene glycol, said liquid composition falling within the ABCA of FIGURE 1.

22. The method of claim 21, wherein said aromatic solvent is xylene, said olefin polymer is polypropylene, said liquid composition comprises between about 50 to 55 weight percent xylene, between about 35 to 39 weight percent methanol, and between about 8 to 13 weight percent ethylene glycol, and said contacting, forming and separating said two phases is performed at between about 125° to 145° C.

References Cited

UNITED STATES PATENTS

| 2,869,772 | 1/1959 | Ray | 260—94.9 |
| 2,928,815 | 3/1960 | Hammer | 260—94.9 |
| 2,940,963 | 6/1960 | Benkowski | 260—94.9 |

FOREIGN PATENTS

| 828,690 | 2/1960 | Great Britain. |

JOSEPH L. SCHOFER, *Primary Examiner.*

F. L. DENSON, *Assistant Examiner.*